A. GUILLEMIN & J. LEHMAN.
STRAINER.

No. 193,244. Patented July 17, 1877.

Attest:
Jno. P. Brooks.
C. A. Snow.

Inventors:
A. Guillemin & J. Lehman
by Louis Bagger & Co.
Attys

UNITED STATES PATENT OFFICE.

ADOLPH GUILLEMIN AND JOHN LEHMAN, OF LANESBOROUGH, MINN.

IMPROVEMENT IN STRAINERS.

Specification forming part of Letters Patent No. 193,244, dated July 17, 1877; application filed December 26, 1876.

*To all whom it may concern:*

Be it known that we, ADOLPH GUILLEMIN and JOHN LEHMAN, of Lanesborough, in the county of Fillmore and State of Minnesota, have invented certain new and useful Improvements in Strainers; and we do hereby declare that the following is a full, clear, and exact description thereof, which will enable others skilled in the art to which it appertains to make and use the same, reference being had to the accompanying drawings, which form a part of this specification, and in which—

Figure 1:
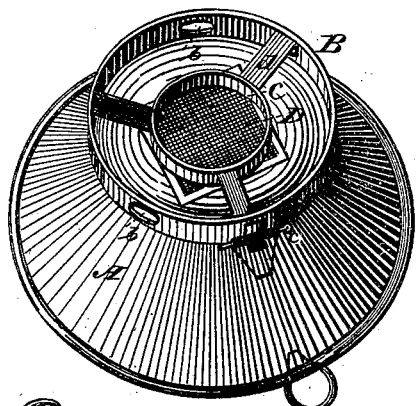
Figure 2:
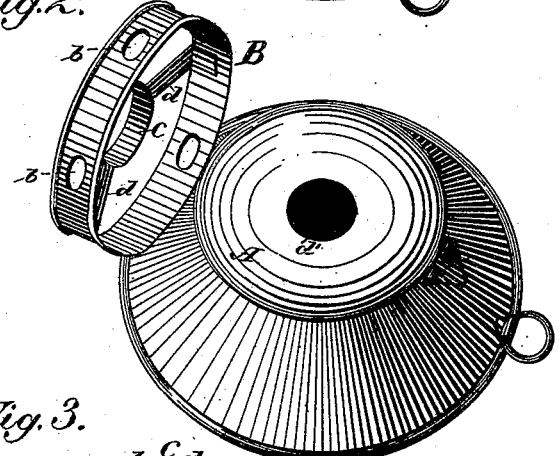
Figure 3:
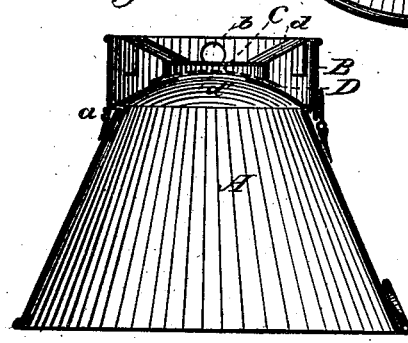
Figure 4:
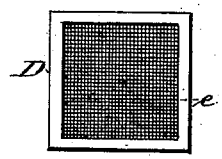

Figure 1 is a perspective bottom view of our improved strainer closed and ready for use. Fig. 2 is a similar view of the strainer open and the straining-cloth removed. Fig. 3 is a vertical section, and Fig. 4 represents the strainer-cloth removed from the strainer.

Similar letters of reference indicate corresponding parts in all the figures.

This invention consists in the construction and arrangement of parts of a strainer suitable for straining tea, coffee, impure water, &c., in such a manner that straining-cloth of different meshes may be used, and the strainer thereby adapted to various purposes, for which, otherwise, a separate strainer would have to be used in each case.

In the drawing, A is the cup or body of the strainer, which is preferably funnel-shaped, as shown on the drawing.

B is a metallic ring or sleeve, having perforations $b\ b$, and hinged to the body A at $a$. When closed, ring B is kept in place by a lock-pin, $c$, or some equivalent device.

$d\ d\ d$ are arms or brackets, projecting inwardly from the ring or sleeve B, so as to support the concentric clamp-ring C, which, when ring B is closed, will press against the under side of the cup or funnel A with its upper edge.

The strainer-cloth D consists of a piece of wire-cloth or perforated tin-plate of any suitable shape, which is placed over the perforation $d'$ in the bottom of the cup A.

By closing ring B, the smaller concentric ring C will press it firmly against the bottom of the funnel, clamping it securely in its place. To remove or change the strainer-cloth all that is required is to unlock the ring and open it.

When wire-cloth is used for the strainer, the edges are dipped in solder, as represented at $e$ in Fig. 4, for the purpose of preventing the edges from becoming uneven or ragged.

Our improved strainer may be used with cloth of different grades, the change being made in a few seconds. Being compact and simple in construction, it is not liable to get out of order, and as the strainer-cloth can be removed the whole apparatus can be cleansed much more effectually than if it formed an inherent part thereof, as in ordinary strainers.

Having thus described our invention, we claim and desire to secure by Letters Patent of the United States—

1. The combination of the funnel or body A, having perforation $d'$, with the hinged sleeve or ring B, having radiating arms $d$, and clamping-ring C, substantially as and for the purpose hereinbefore set forth.

2. The combination of the funnel or body A, sleeve B, and clamping-ring C with the removable strainer-cloth D, substantially as and for the purpose hereinbefore set forth.

In testimony that we claim the foregoing as our own we have hereto affixed our signatures in presence of two witnesses.

ADOLPH GUILLEMIN.
JOHN LEHMAN.

Witnesses:
JAMES R. JONES,
JULIUS STEVENS.